(12) United States Patent
Lien

(10) Patent No.: US 6,463,884 B1
(45) Date of Patent: Oct. 15, 2002

(54) BIRDREST STRUCTURE

(76) Inventor: Hui-Chuan Lien, P.O. Box 453, Taichung (TW)

( * ) Notice: Subject to any disclaimer, the term of this patent is extended or adjusted under 35 U.S.C. 154(b) by 0 days.

(21) Appl. No.: 10/066,687

(22) Filed: Feb. 6, 2002

(51) Int. Cl.[7] .............................................. A01K 31/12
(52) U.S. Cl. ........................ 119/537; 119/468; 119/469
(58) Field of Search ................................ 119/537, 469, 119/468, 531

(56) References Cited

U.S. PATENT DOCUMENTS

| 266,555 | A | * | 10/1882 | Thorpe ........................ 119/468 |
| D76,406 | S | * | 9/1928 | Leon |
| D103,963 | S | * | 4/1937 | Butler |
| 5,218,927 | A | * | 6/1993 | Addams ....................... 119/537 |
| 5,381,758 | A | * | 1/1995 | Simon .......................... 108/156 |
| 5,511,512 | A | * | 4/1996 | Pintavalli et al. ............ 119/468 |
| 5,632,230 | A | * | 5/1997 | Dornetta ...................... 119/537 |

* cited by examiner

*Primary Examiner*—Yvonne R. Abbott

(57) ABSTRACT

A birdrest structure comprises an upright post, a waste receptacle, and a horizontal rod on which a bird is rested. The birdrest structure can be fastened to the wall by a fastening device which is fastened with the bottom end of the upright post. The birdrest structure can be hanged on the backrest of a car seat by a hanging frame which is fastened with the bottom end of the upright post. The birdrest structure can be placed at a level on the floor by a support frame which is fastened with the waste receptacle.

5 Claims, 10 Drawing Sheets

BIRDREST STRUCTURE

BACKGROUND OF THE INVENTION

1. Field of the Invention

The present invention relates generally to a pet-keeping accessory, and more particularly to a structure to rest the bird on.

2. Description of Related Art

There are a variety of conventional birdrests, which can not be easily fixed on an object located indoors or outdoors. In addition, the conventional birdrests are not provided with means to mount the birdrests securely in the interior of an automotive vehicle, so as to facilitate the pet bird of a person to accompany on his or her trip. Moreover, the conventional birdrests are not provided with a built-in receptacle for collecting wastes of the pet bird.

BRIEF SUMMARY OF THE INVENTION

The primary objective of the present invention is to provide a birdrest structure free of the shortcomings of the conventional birdrests described above.

In keeping with the principle of the present invention, the foregoing objective of the present invention is attained by a birdrest structure comprising an upright post, a horizontal rod, and a waste receptacle. The upright post is provided with a fastening device to fasten the birdrest structure to the wall. The upright post is further provided with a hanging frame by means of which the birdrest structure can be held by an object, such as the backrest of a car seat. The waste receptacle is provided with a support frame for supporting the birdrest structure on a surface.

The features and the advantages of the present invention will be more readily understood upon a thoughtful deliberation of the following detailed description of the present invention with reference to the accompanying drawings.

DETAILED DESCRIPTION OF THE INVENTION

Figure 1:
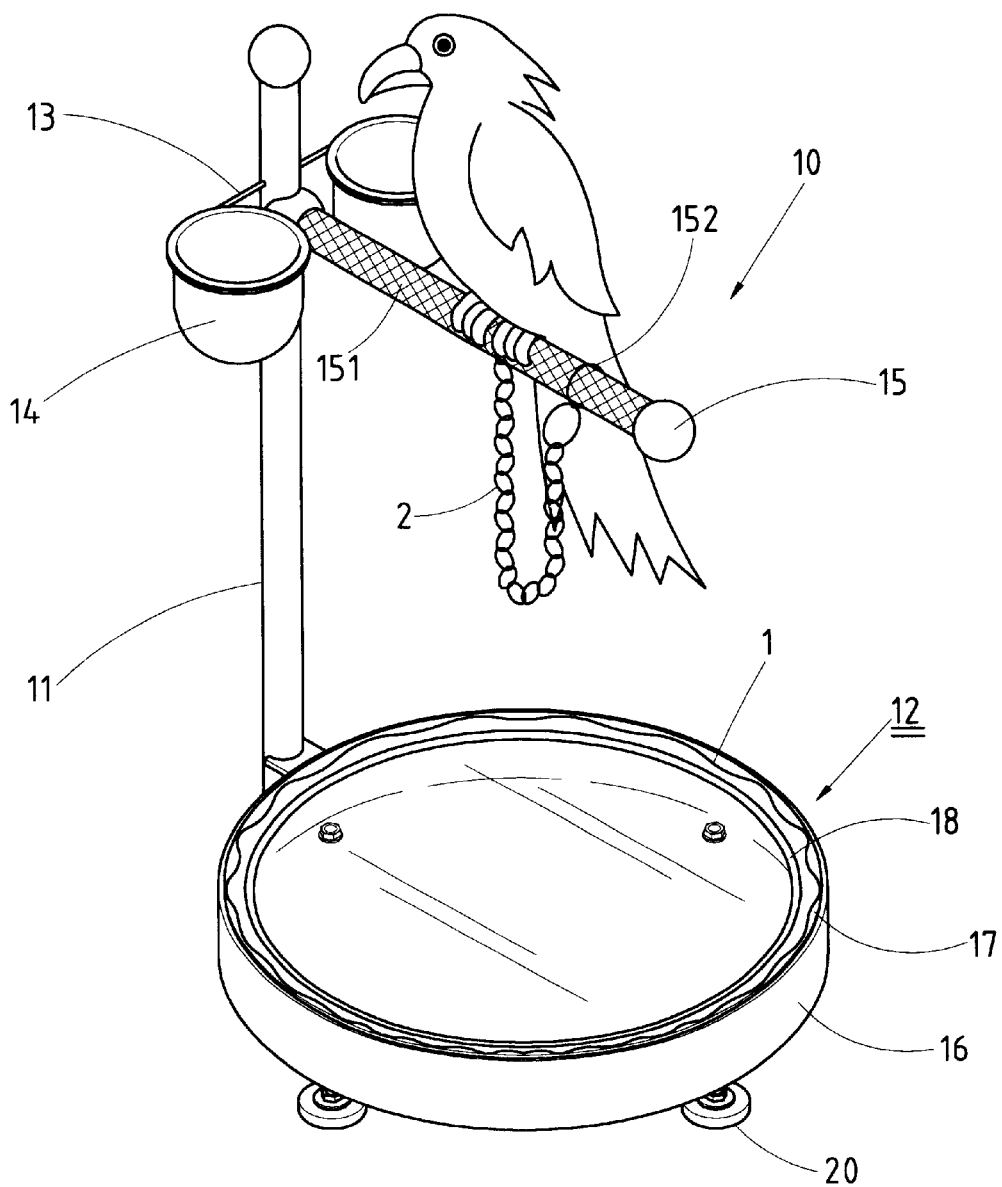
FIG. 1 shows a perspective view of the present invention.
Figure 2:
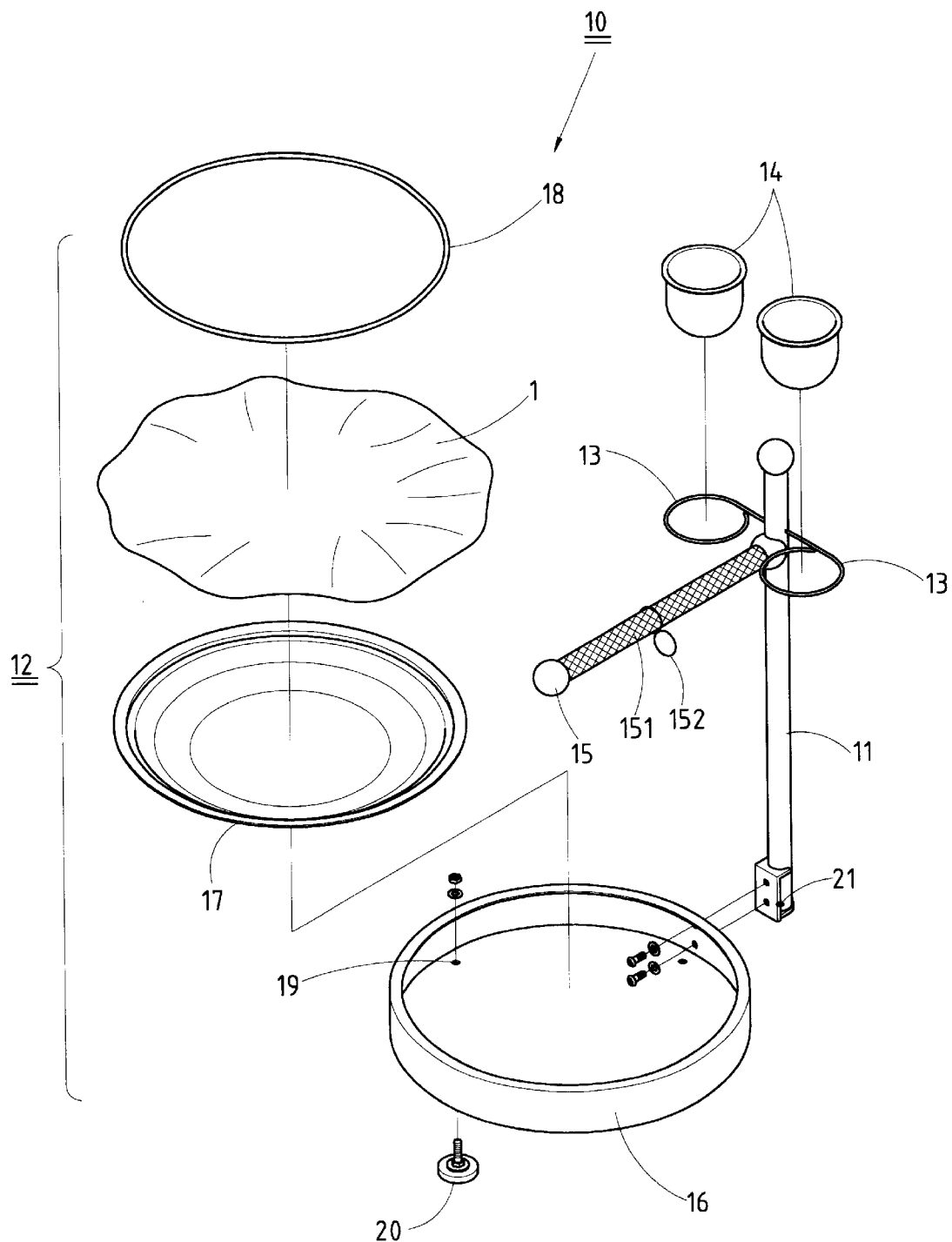
FIG. 2 shows an exploded view of the present invention.

As shown in FIGS. 1 and 2, a birdrest structure 10 of the present invention comprises an upright post 11, a waste receptacle seat 12, and a horizontal rod 15.

The upright post 11 is provided at the upper end with two retaining rings 13 for retaining two containers 14 for holding water or bird feed.

The waste receptacle seat 12 is fastened to the bottom end of the upright post 11 by a plurality of fastening screws which are engaged with the threaded holes of the bottom end of the upright post 11. The waste receptacle 16 is a basin and is provided in the bottom wall with a plurality of through holes 19 for fastening a plurality of base pads 20. The basin 16 contains a sanitation paper 1, which is located in the basin 16 by a paper locating piece 17 and a paper pressing piece 18. The sanitation paper 1 is used to collect the wastes of the bird.

The horizontal rod 15 is used as a footrest of the bird and is provided with a knurled surface 151 and a chain 2 which is fastened at one end to a fastening ring 152 of the horizontal rod 15.

The birdrest structure 10 can be rested on a surface such that the base pads 20 of the underside of the waste receptacle 16 come in contact with the surface.

Figure 3:
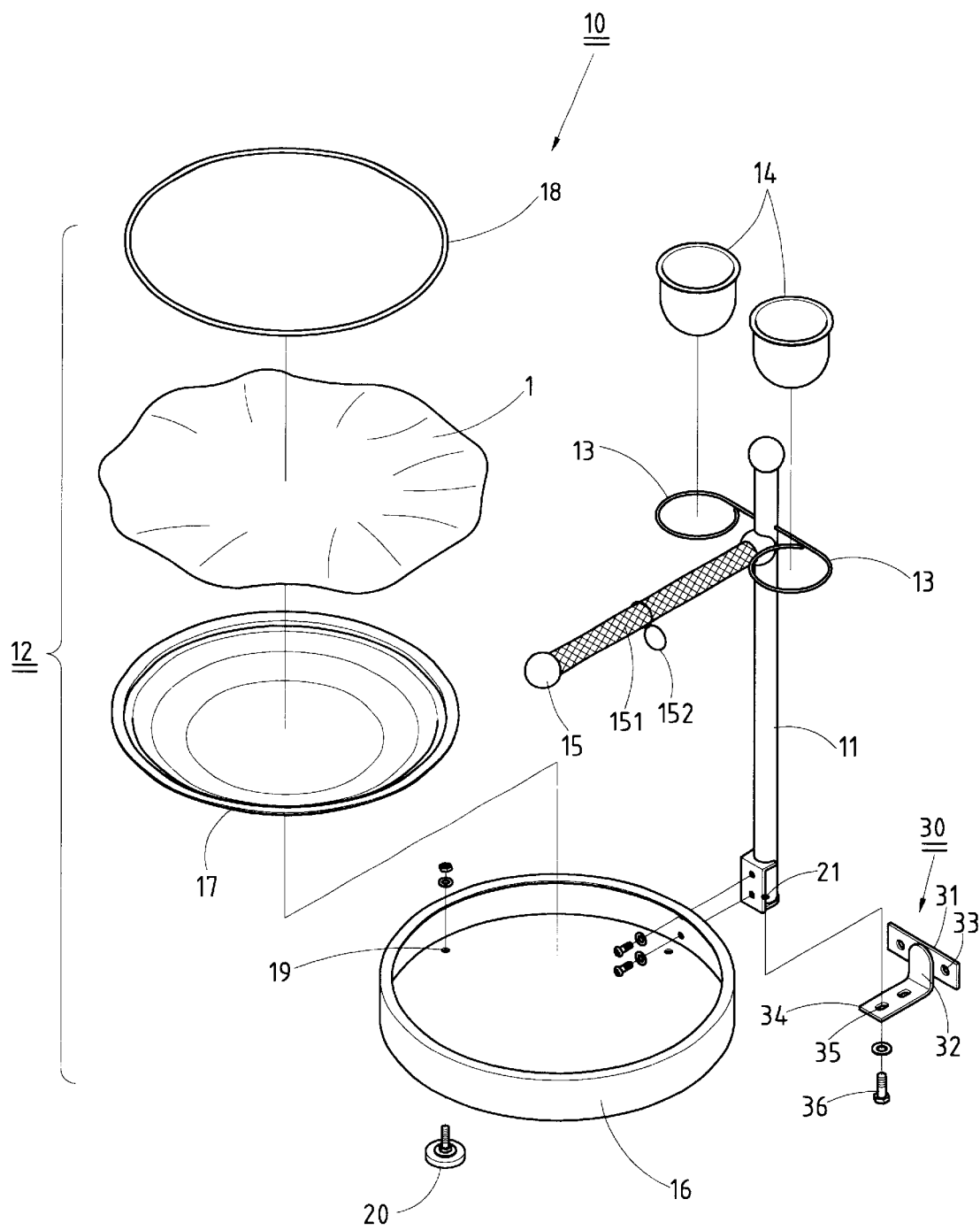
FIG. 3 shows an exploded view of the upright post and the fastening device of the. present invention.
Figure 4:
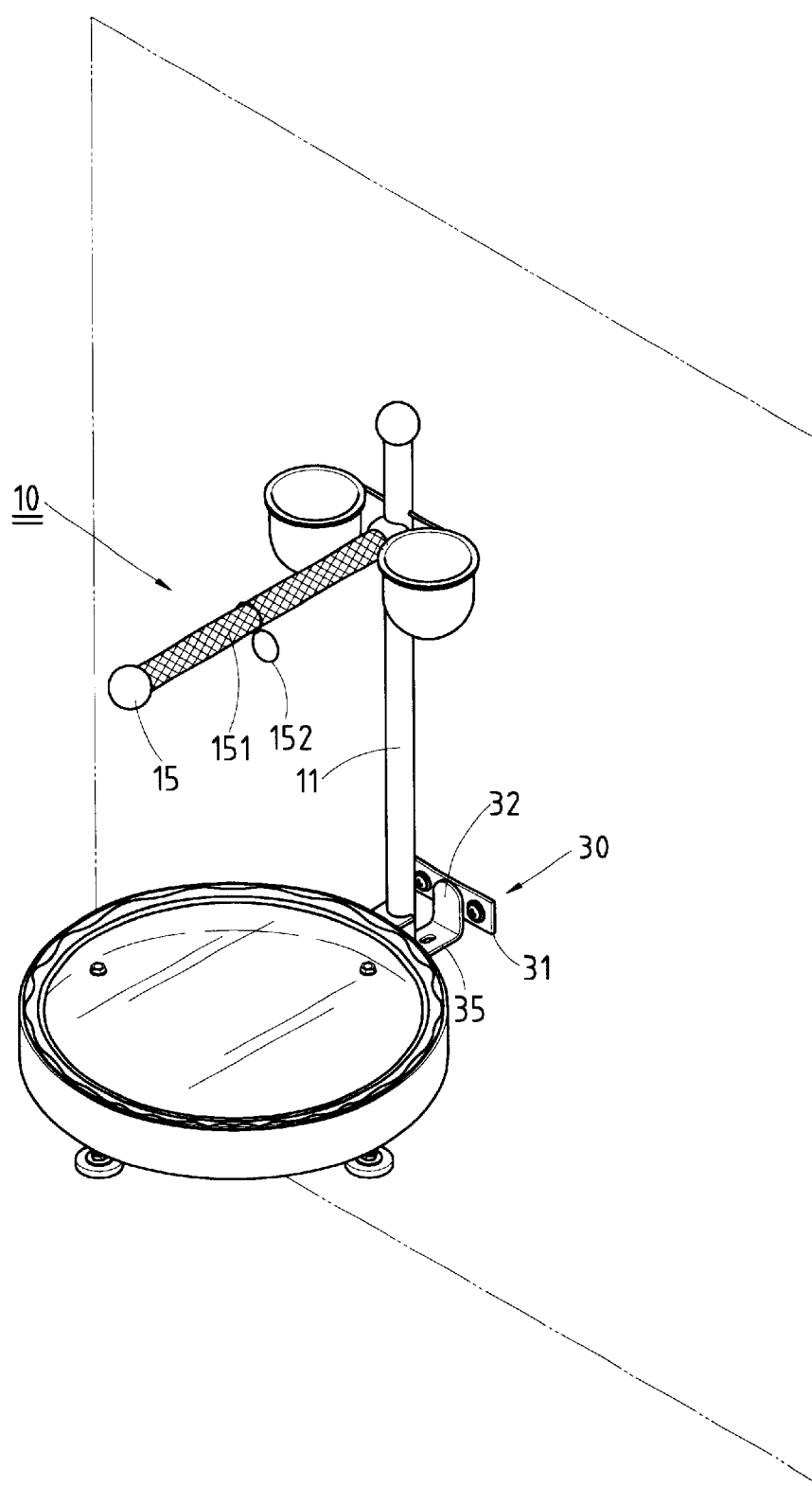
FIG. 4 shows a schematic view of the present invention being fastened to a wall by means of the fastening device as shown in FIG. 3.
Figure 5:
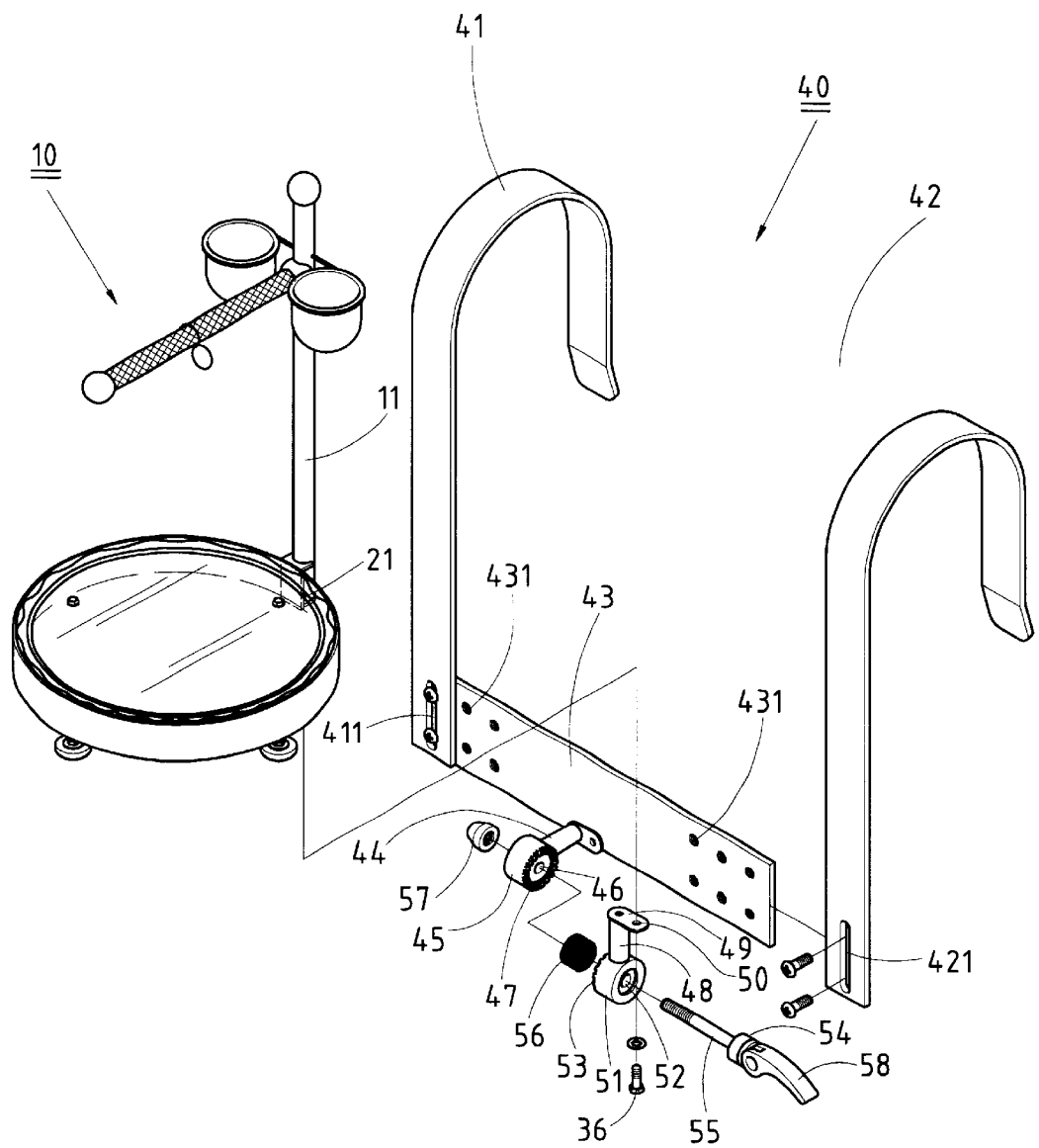
FIG. 5 shows an exploded view of the upright post and the hanging frame of the present invention.
Figure 6:
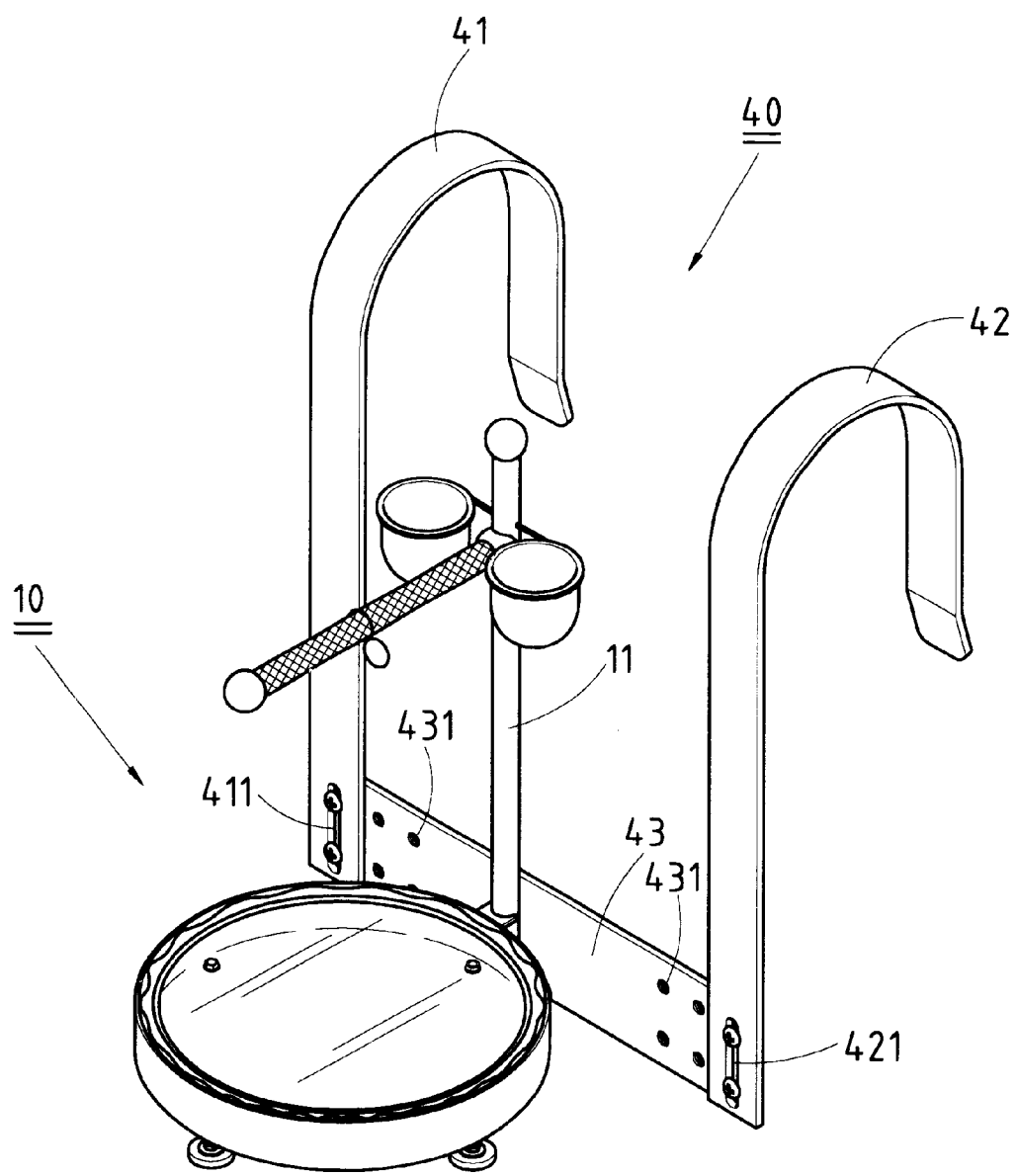
FIG. 6 shows a perspective view of the upright post and the hanging frame of the present invention in combination.

As shown in FIGS. 3 and 4, the upright rod 11 is provided at the bottom end with a fastening device 30 comprising an upright plate 31, a horizontal plate 34, and a fastening bolt 36. The upright plate 31 and the horizontal plate 34 are connected by a connection piece 32. The upright plate 31 is provided with a plurality of through holes 33. The horizontal plate 34 is provided with one or more through holes 35. The fastening device 30 is fastened with the bottom end of the upright post 11 by the fastening bolt 36, which is engaged with a longitudinally-oriented threaded hole 21 of the bottom end of the upright post 11 via one of the through holes 35 of the horizontal plate 34. The birdrest structure 10 of the present invention can be thus fastened to a wall by the fastening device 30 such that the upright plate 31 of the fastening device 30 is fastened to the wall by a plurality of fastening bolts, which are fastened onto the wall via the through holes 33 of the upright plate 31.

Figure 7:
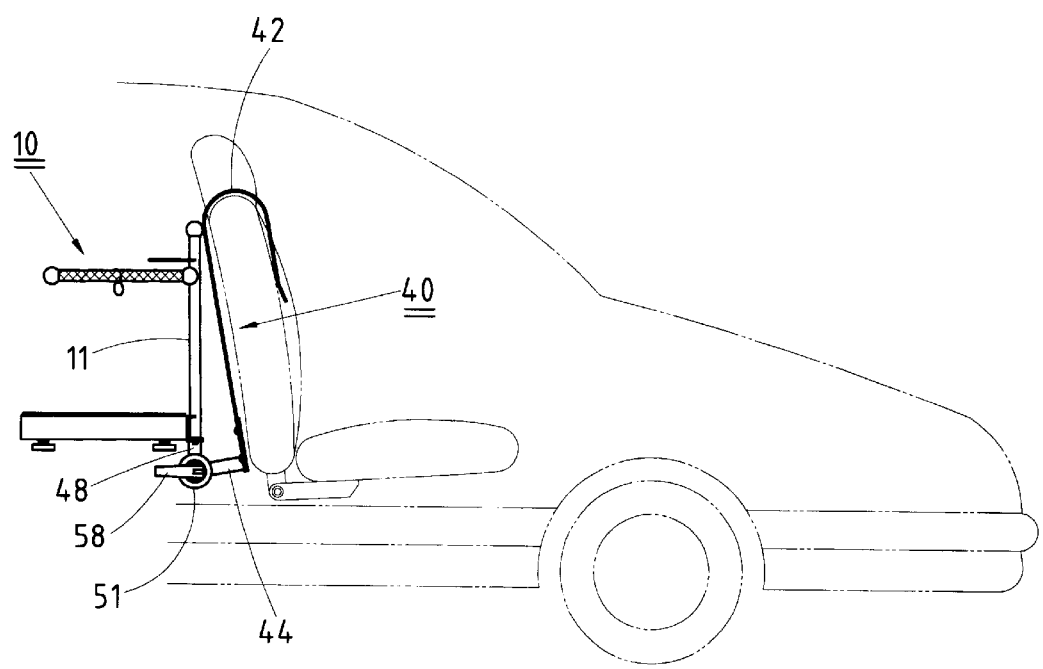
FIG. 7 shows a schematic view of the present invention being held by a car seat.
Figure 8:
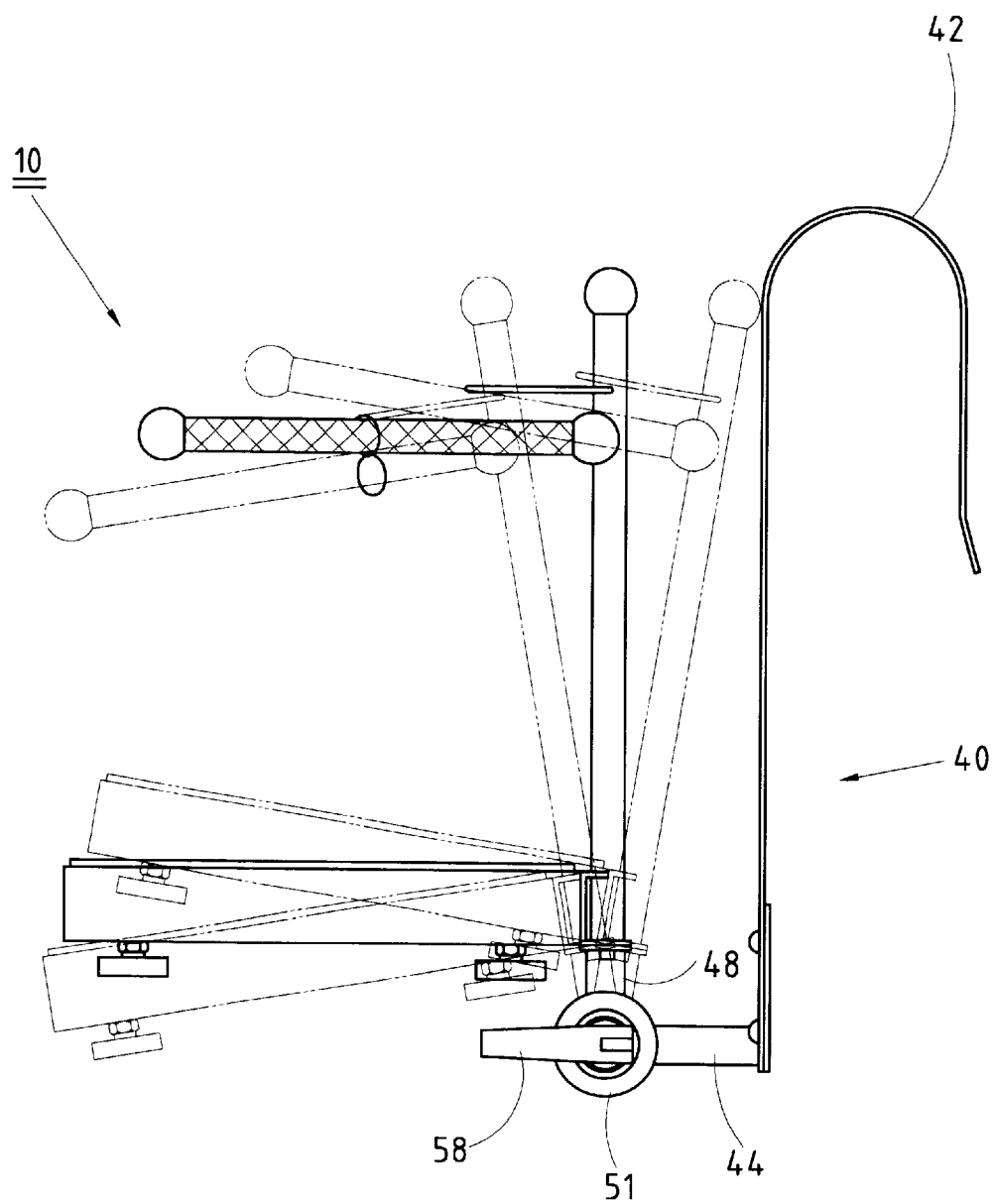
FIG. 8 shows a schematic view of an adjustable feature of the present invention.

As shown in FIGS. 5–8, the upright post 11 is provided at the bottom end with a hanging frame 40 comprising a horizontal plate 43 and two L-shaped plates 41 and 42 which are fastened at one end with the longitudinal ends of the horizontal plate 43 for hanging the birdrest structure 10 to the backrest of a car seat, as shown in FIG. 7. The horizontal plate 43 is provided at the two longitudinal ends with a plurality of threaded holes 431. The first L-shaped plate 41 is provided with a plurality of through holes 411 and is fastened with the horizontal plate 43 by a plurality of fastening bolts which are engaged with the threaded holes 431. In the similar manner, the second L-shaped plate 42 is fastened with the horizontal plate 43. The horizontal plate 43 is fastened with the bottom end of the upright post 11 by a fastening projection 45, a movable pillar 51, and a control rod 55. The fastening projection 45 is extended from a fastening rod 44 of the horizontal plate 43 and is provided with a through hole 46. The movable pillar 51 is provided with a through hole 52, a seat rod 48, a plate 49 with a through hole 50 corresponding in location to the threaded hole 21 of the bottom end of the upright post 11. The fastening projection 45 is provided with a serrated portion 47. The movable pillar 51 is provided with a serrated portion 53 engageable with the serrated portion 47 of the fastening projection 45. The hanging frame 40 is fastened to the upright post 11 by the fastening bolt 36, which is engaged with the longitudinally-oriented threaded hole 21 of the bottom end of the upright post 11 via the through hole 50 of the seat rod 48. In the meantime, the serrated portion 47 of the fastening projection 45 is engaged with the serrated portion 53 of the movable pillar 51, and that the control rod 55 is put through the through hole 46 of the fastening projection 45 and the through hole 52 of the movable pillar 51 to engage a nut 57. The control rod 55 is provided with a fast disengagement portion 54 and a handle 58. As shown in FIG. 8, the upright post 11 can be tilted by using the control rod 55 to bring about the disengagement of the serrated portion 47 of the fastening projection 45 with the serrated portion 53 of the movable pillar 51 in conjunction with a spring 56.

Figure 9:
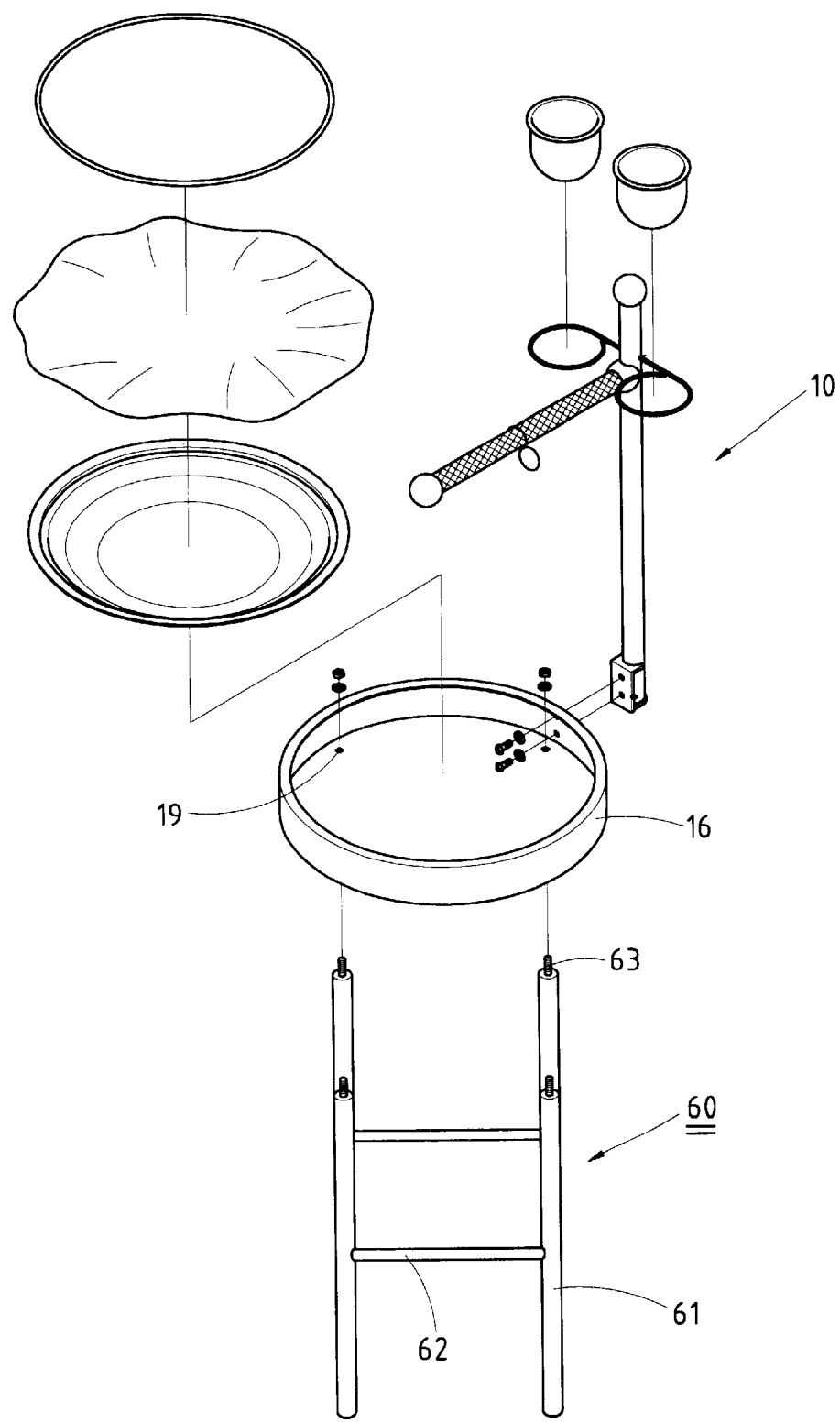
FIG. 9 shows an exploded view of the upright post, the receptacle, and the support frame of the present invention.
Figure 10:
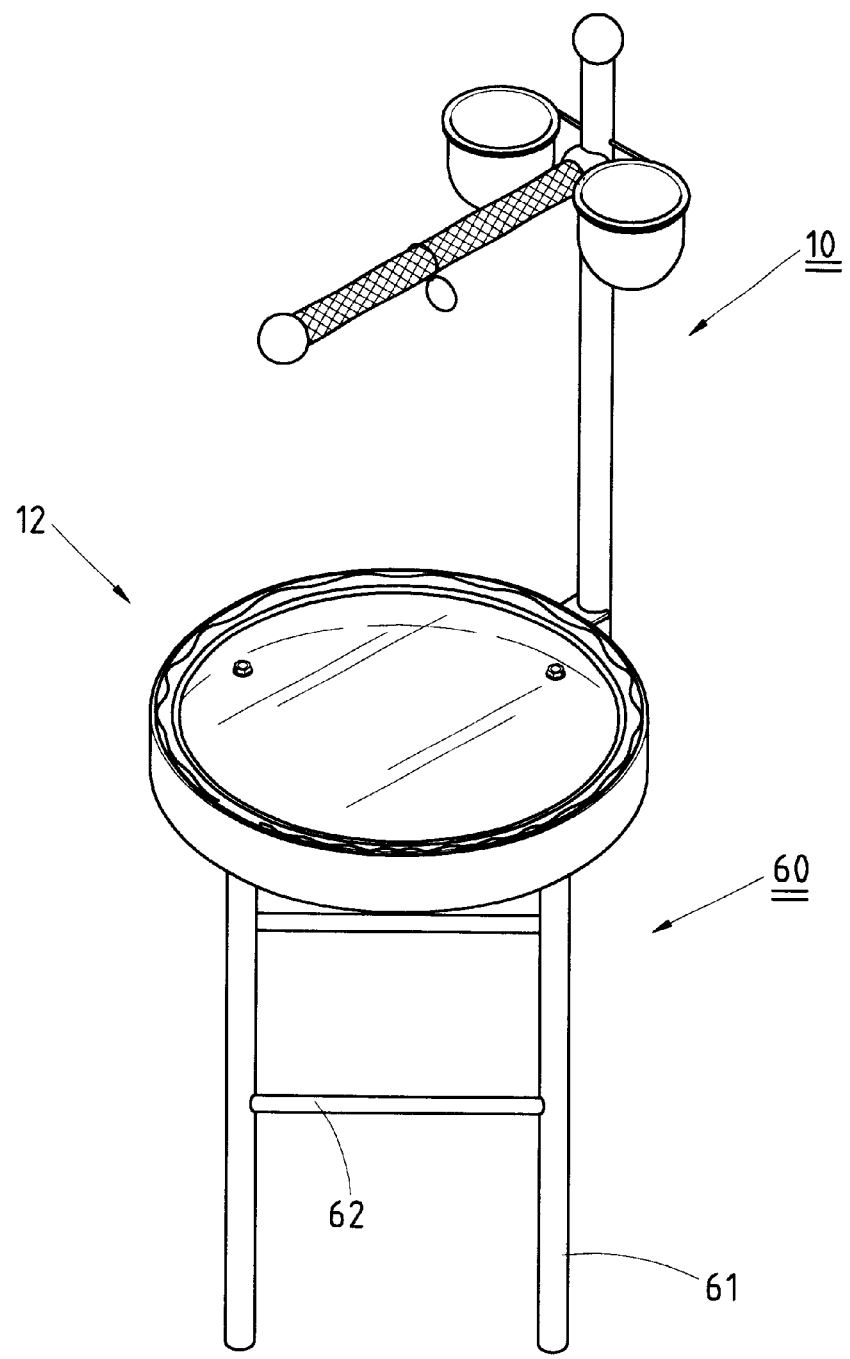
FIG. 10 shows a perspective view of the present invention being supported on a surface by the support frame of the waste receptacle.

As shown in FIGS. 9 and 10, the waste receptacle seat 12 is provided in the underside with a support frame 60 comprising four support rods 61 which are braced by a plurality of connection rods 62 and are provided at the top end with a threaded rod 63. The birdrest structure 10 is supported by the support frame 60 such that the threaded rods 63 of the support rods 61 are engaged with nuts via the through holes 19 of the waste receptacle seat 12.

The present invention described above is to be regarded in all respects as being illustrative and nonrestrictive. Accordingly, the present invention may be embodied in other specific forms without deviating from the spirit thereof. For example, the waste receptacle seat 12 may be of a polygonal construction. The present invention is therefore to be limited only by the scopes of the following claims.

I claim:

1. A birdrest structure comprising:

an upright post provided at a bottom end with a longitudinally-oriented threaded hole, and in proximity of a top end thereof with a plurality of retaining rings for retaining a plurality of containers for holding water or bird feed;

a horizontal rod fastened at one end with the top end of said upright post and provided with a knurled surface, said horizontal rod being used as the footrest of a bird; and a waste receptacle fastened with the bottom end of said upright post for collecting wastes of the bird resting on said horizontal rod, said waste receptacle provided in a bottom wall with a plurality of through holes, and in the underside of the bottom wall thereof with a plurality of base pads fastened therewith.

2. The birdrest structure as defined in claim 1, wherein said upright post is provided at the bottom end with a fastening device fastened therewith, said fastening device comprising an upright plate and a horizontal plate, said horizontal plate being provided with one or more through holes and fastened with the bottom end of said upright post by a fastening bolt which is engaged with said threaded hole of the bottom end of said upright post via one of said through holes of said horizontal plate whereby said upright plate is provided with a plurality of through holes and is fastened to a wall by a plurality of fastening bolts which are fastened onto the wall via said through holes of said upright plate.

3. The birdrest structure as defined in claim 1, wherein said upright post is provided at the bottom end with a hanging frame fastened therewith to facilitate the hanging of said birdrest structure on the backrest of a car seat, said hanging frame comprising a horizontal plate, two L-shaped plates fastened with two longitudinal ends of said horizontal plate, a fastening projection extending from said horizontal plate and having a serrated portion, a seat rod provided at one end with a plate having a through hole, and a movable pillar fastened with other end of said seat rod and provided with a serrated portion engageable and disengageable with said serrated portion of said fastening projection, said hanging frame being fastened to said upright post such that said plate of said seat rod is fastened with the bottom end of said upright post by a fastening bolt which is engaged with said longitudinally-oriented threaded hole of the bottom end of said upright post via said through hole of said plate of said seat rod, and that said serrated portion of said fastening projection is engaged with said serrated portion of said movable pillar in conjunction with a control rod and a spring whereby said control rod and said spring bring about the disengagement of said serrated portions of said fastening projection and said movable pillar, thereby enabling said upright post to be tilted.

4. The birdrest structure as defined in claim 1, wherein said waste receptacle is provided in the underside with a support frame fastened therewith to facilitate the supporting of said birdrest structure on a surface whereby said support frame comprises a plurality of support rods, each being provided at a top end with a threaded rod, said support frame being fastened to the underside of said waste receptacle such that said threaded rod of each of said support rods is fastened with a nut via one of said through holes of the bottom wall of said waste receptacle.

5. The birdrest structure as defined in claim 1, wherein said waste receptacle is of a polygonal construction.

* * * * *